United States Patent [19]
Herzog et al.

[11] 3,900,783
[45] Aug. 19, 1975

[54] BATTERY CHARGING CIRCUIT
[75] Inventors: Rollie R. Herzog, Burnt Hills, N.Y.; Robert P. Alley, Danville, Ill.
[73] Assignee: General Electric Company, Indianapolis, Ind.
[22] Filed: Apr. 8, 1974
[21] Appl. No.: 458,861

[52] U.S. Cl. .................... 320/2; 307/66; 320/35; 320/48; 320/25
[51] Int. Cl.² .................................................. H02J 7/00
[58] Field of Search .............. 320/2, 25, 35, 36, 48; 307/4, 66, 150

[56] References Cited
UNITED STATES PATENTS

| | | | |
|---|---|---|---|
| 2,022,874 | 12/1935 | West | 320/35 |
| 2,354,877 | 8/1944 | Peters | 320/35 X |
| 2,920,260 | 1/1960 | Goffstein | 320/2 X |
| 3,316,417 | 4/1967 | Tolmie | 307/66 |
| 3,360,708 | 12/1967 | Palmer-Persen | 320/2 |
| 3,659,179 | 4/1972 | Barker et al. | 320/2 |
| 3,746,961 | 7/1973 | Doble | 320/2 X |

*Primary Examiner*—J. D. Miller
*Assistant Examiner*—Robert J. Hickey

[57] ABSTRACT

A circuit for charging a battery used as a power source for an emergency lighting system. The circuit is connected to the battery by a three connector plug-socket unit. First and second leads connect the circuit to an A.C. power source. A first rectifier is connected between the first lead and a first plug connector. A first socket connector is connected to the battery and is adapted to receive the first plug connector for connecting the charging circuit to one side of the battery. A current limiting resistor is connected to the other side of the battery and may be physically coupled to the battery case. A thermal responsive switch is connected across the current limiting resistor for changing the charging current level of the battery as a function of the battery temperature. A second socket connector is connected to the current limiting resistor and is adapted to receive a second plug connector. The second plug connector is connected to the second lead. An inverter circuit for operating a gaseous discharge lamp is connected to third and fourth leads. The third lead is connected to the first plug connector and the fourth lead is connected to a third plug connector. The third plug connector is adapted to be connected to a third socket connector which is connected to the other side of the battery. A lamp for indicating the proper connector mating in the plug-socket unit is connected in series with a second rectifier. This series combination is connected between the first and fourth leads.

10 Claims, 3 Drawing Figures

BATTERY CHARGING CIRCUIT

BACKGROUND OF THE INVENTION

This invention relates to a battery charging circuit. More particularly, it relates to a circuit for charging a battery utilizing a three connector plug-socket unit wherein a means is provided to indicate that the plug is not properly mated to the socket. The invention further relates to a battery charging circuit having a thermal responsive current limiting means connected in a circuit relationship and a physical relationship with the battery for limiting charging current and heating the battery for a predetermined battery temperature range.

Batteries have long been used to provide power for gaseous discharge lamps and other loads. These batteries have been shown to be especially useful in providing power for gaseous discharge lamps during emergency conditions, that is, while the normal A.C. operating voltage is interrupted. The battery is usually connected to an inverter circuit which provides the alternating voltage which is necessary in the operation of most gaseous discharge lamps, e.g. fluorescent. The battery is usually housed in a container separate from the remainder of the emergency system, e.g. the charging circuit, therefore external connectors are needed.

Various charging circuits have been used in the past to maintain the battery at a proper potential while there is A.C. voltage available. One such prior art circuit is shown in FIG. 2.

FIG. 2 shows the charging circuit connected to A.C. source 1 through leads 2 and 3. Battery 6 is connected to the charging circuit by two connector plug-socket unit 50, which includes plug 14 and socket 15. The anode of rectifier 4 is connected to lead 2. A first plug connector 5 is connected to the cathode of rectifier 4 and is adapted to be received in socket connector 8 which is connected to the positive side of battery 6. A second plug connector 7 is connected to lead 3 and is adapted to be connected to socket connector 10 which is connected to the negative side of the battery. Inverter 9, which operates gaseous discharge lamp 11, is connected to plug 14, which includes connectors 5 and 7. Inverter 9 converts the D.C. voltage of battery 6 to an alternating voltage for operating lamp 11 when plug 14 and socket 15 are mated.

Rectifier 12 is connected in series with incandescent lamp 13 and this arrangement is connected between leads 2 and 3. Battery 6 is charged on the positive half cycle of A.C. source 1 through rectifier 4 when the plug-socket unit is mated. Lamp 13 comes on during the negative half cycle of A.C. source 1 indicating that the battery is charging. However, lamp 13 will remain on even if plug 14 is disconnected from socket 15. Therefore the circuit arrangement only indicates that power from source 1 is available. Not only is it possible for battery 6 to be unknowingly undercharged, it is also possible that battery power will not be available to the inverter during the emergency conditions since lamp 13 will remain on even when the plug-socket unit is not properly mated.

Problems also occur if the battery is exposed to either low or high temperatures. Utilizing a normal charging rate, certain batteries at too low a temperature, e.g. below 5°C, may cause the electrolyte in battery cells to be depleted, thereby causing a reduced capacity of the battery. Also certain batteries at too high a temperature, e.g. 65°C, being charged at a normal rate also have been known to lose capacity. This charging rate and temperature problem may be better understood by referring to General Electric Company, Application Engineering Handbook published in March 1971, Publication Number GET-3148, pp. 4–5 through 4–8.

OBJECTS OF THE INVENTION

Accordingly, one object of this invention is to provide an improved battery charging circuit.

Another object is to provide a battery charging circuit for use with an emergency lighting system, the circuit having a three connector plug-socket unit between the circuit and the battery wherein an improper mating of the connectors is reliably indicated.

Another object of the invention is to provide a battery charging circuit including thermal responsive current limiting means for limiting charging current for predetermined high or low temperatures.

Another object is to provide a battery charging circuit having a thermal responsive current limiting means for limiting charging current and heating the battery during predetermined low temperatures.

SUMMARY OF THE INVENTION

In accordance with one form of this invention, there is provided a battery charging circuit having a unit with first, second and third connectors for connecting the circuit to the battery. First and second leads are provided for connecting the circuit to an A.C. source. Third and fourth leads are provided for connecting the battery to a load. A first rectifier is connected between the first lead and the first connector for providing a charging path for the battery during the one A.C. half cycle. A second lead is connected to the second connector. A third lead is connected to the first connector and the fourth lead is connected to the third connector. A second rectifier is connected in series with an indication means. This series combination is connected between the first and the fourth lead for providing a current path during the other A.C. half cycle, whereby the indication means will indicate that the unit is not connecting the circuit to the battery.

BRIEF DESCRIPTION OF THE DRAWINGS

The subject matter which is regarded as the invention is set forth in the appended claims. The invention, itself, however, together with further objects and advantages thereof may be better understood by reference to the following description taken in conjunction with the accompanying drawings in which:

DESCRIPTION OF THE PREFERRED EMBODIMENT

Figure 1:
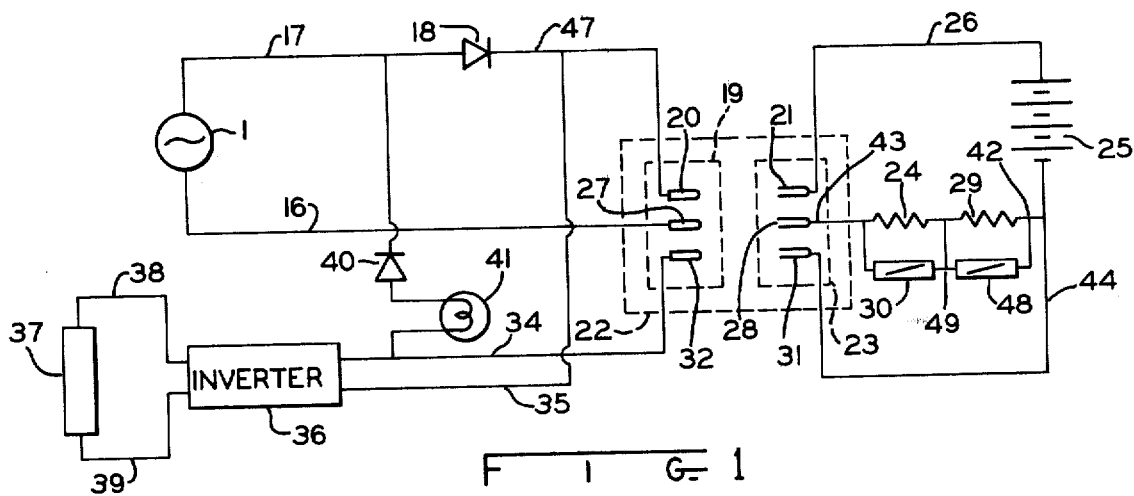
FIG. 1 is a schematic circuit diagram of one form of the invention.

Referring now, more particularly, to FIG. 1, there is provided a charging circuit and inverter 36 connected to a battery 25 by a two-part, selectively-severable junction device such as plug-socket unit 22. Plug-socket unit 22 may be a well known type and includes a first section such as plug 19 and a second section such as socket 23. Plug 19 includes connectors 20, 27 and 32 which, in the exemplification embodiment, are male types. Socket 23 includes connectors 21, 28 and 31 which, in the exemplification embodiment, are female types. A.C. power source 1 may include a charging transformer (not shown). The anode of a first rectifier 18 is connected to lead 17. The cathode of rectifier 18, which in this embodiment is a diode, is connected to first plug connector 19. Socket connector 21 is connected to the positive side of battery 25 through line 26. Battery 25 may be a well known type, e.g. nickel cadmium. In the exemplification embodiment the battery is used for operating inverter 36 which, in turn, operates gaseous discharge lamp 37 during emergency conditions, that is, while normal A.C. power has been interrupted. Lead 16 is connected to plug connector 27. Socket connector 28 is adapted to receive plug connector 27 and is connected to one side of current limiting resistor 24 and to one side of high temperature thermal switch 30. Current limiting resistor 24 and high temperature thermal switch 30 are connected in parallel to form one thermal responsive current limiting means. A second current limiting resistor 29 is connected in parallel with low temperature thermal switch 48 to form another thermal responsive current limiting means. These two thermal responsive current limiting means are connected in series and the second is connected to the negative side of battery 25. Resistor 29 is connected in physical proximity to battery 25 as will be explained further with reference to FIG. 3.

Again, referring to FIG. 1, high and low temperature thermal switches 30 and 48 are of the type well known in the art. Low temperature thermal switch 48 may be set to close and thus short circuit current limiting resistor 29 when the battery temperature is normal and to open when the battery temperature is too low. High temperature thermal switch 30 may be set to short circuit current limiting resistor 24 when the battery temperature is normal and to be open when the temperature is too high. Other types of thermal responsive devices may be used, for example, thermistors may be used in place of the parallel combination of the current limiting resistors 24 and 29 and the thermal switches 30 and 48. If the battery, such as a nickel cadmium type, is too cold, e.g. below 5°C, there is a possibility that too high a charging current will cause some of the electrolyte in the cells of the battery to be converted into a gas and perhaps dissipated through the battery case as a safety valve. This would reduce the capacity of the battery thereby reducing the power output of the battery and decreasing its life. If the battery temperature goes too high, e.g. above 65°C, during normal charging, again some battery capacity may be lost.

Socket connector 31 is connected to the negative side of battery 25. Plug connector 32 is adapted to be connected to socket connector 31 and to a fourth lead 34. A third lead 35 is connected to the cathode of first rectifier 18. Third and fourth leads 34 and 35 are then connected across battery 25 and are further connected to inverter 36 for providing power to the inverter when normal power is interrupted.

Inverter 36 is provided for converting D.C. battery voltage to an alternating voltage suitable for operating gaseous discharge lamp 37. Gaseous discharge lamp 37 is connected to inverter 36 through leads 38 and 39. Gaseous discharge lamp 37 may be a fluorescent type which must be operated on alternating voltage, however, gaseous discharge lamp 37 may also be of a type, such as mercury, which may be operated directly from D.C., and therefore inverter 36 may not be needed.

There is further provided rectifier 40 connected in series with indicating lamp 41 which, in the exemplification embodiment, is of the incandescent type. Incandescent lamp 41 provides indication as to whether plug 19 is connected to socket 23 which means that battery 25 is being charged and that battery power is available for inverter 36. While lamp 41 will not indicate that plug connector 20 and socket connector 21 alone are open, it will indicate an open circuit in either of the other two plug-socket connectors. Since all of the connectors, in the exemplification embodiment are contained in a single plug-socket unit, the probability of plug connector 20 and socket connector 21 being open alone is very low.

The anode of second rectifier 40 is connected to the one side of the incandescent lamp 41. The cathode of second rectifier 40 is connected to first lead 17. The other side of incandescent lamp 41 is connected to fourth lead 34.

Figure 3:
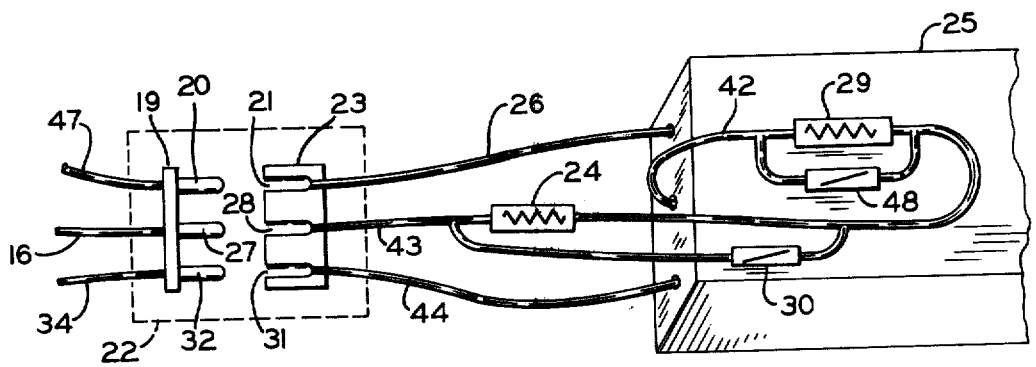
FIG. 3 is a perspective view of a portion of a battery having a thermal responsive current limiting device mounted thereon and further showing the three connector plug-socket unit of FIG. 1.

Referring now to FIG. 3, there is shown the physical proximity of the thermal switches 30 and 48 and resistors 29 and 24 to the battery 25 and also the physical structure of plug-socket unit 22. Thermal switches 30 and 48 are connected across resistors 24 and 29 respectively. Resistor 29 is connected to one side of battery 25 through line 42. Resistor 24 is connected to socket 23 through line 43 which is, in turn, connected to the socket connector 28. Line 26 is also connected to the positive side of battery 25 and to socket 23 at socket connection 21. Line 44 is connected to the negative side of battery 25 and to socket connection 31.

The charging circuit of FIG. 1 is ready to energize the battery when plug 19 is mated with socket 23. Furthermore, the inverter 36 enables the lamp 37 to be energized when this mating occurs.

Plug 19 includes connectors 20, 27 and 32. Connector 20 is connected to lead 47, connector 27 is connected to lead 16, and connector 32 is connected to lead 34. Leads 47, 16 and 34 are further connected to the charging circuit as indicated in FIG. 1. If plug 19 and socket 23 are improperly mated, then incandescent light 41 does not come on thus indicating that the battery is not charging and that the inverter is not properly connected to the battery for emergency operation.

Thermal switches 30 and 48 are connected in close physical proximity to the battery 25 for sensing the temperature of the battery. The current, therefore, can be limited through resistor 29 by opening low temperature thermal switch 48 in response to a predetermined low temperature. Resistor 29 is also connected in close proximity with the battery. The heat dissipated when current flows through this resistor causes the battery to heat up, thus helping to overcome the electrolyte loss problem due to charging a cold battery with high current. Resistor 24 is located a distance from battery 25. The opening of high temperature switch 30 causes current to flow through resistor 24. By having resistor 24 removed from the battery the heat dissipated by this resistor during the high temperature situation will not add to the overhead battery problem.

The operation of the circuit in FIG. 1 and the apparatus as shown in FIG. 3 is as follows:

While the normal A.C. power is uninterrupted, charging current for battery 25 is provided by A.C.

source 1. When the voltage on lead 17 is positive, a current flows from A.C. source 1 through diode 18 and connectors 20 and 21 charging battery 25. A return path is provided from the negative side of battery 25 through normally closed thermal switches 30 and 48, through connectors 27 and 28, then back to A.C. source 1. If the battery temperature is within a certain predetermined temperature range, thermal switches 30 and 48, which are in thermal physical contact with battery 25 as shown in FIG. 3, are closed, thus shorting current around limiting resistors 29 and 24. The majority of the current then flows through switches 30 and 48 and back to alternating current source 1. When the battery temperature drops below a predetermined temperature at which gas may form in the battery cells, low temperature thermal switch 48 opens. When this occurs current travels through limiting resistor 29. When the battery temperature rises above a predetermined temperature at which the battery life may be lessened, high temperature thermal switch 30 opens causing current to go through resistor 24. When the lead 16 goes positive, during the opposite half cycle of alternating current source 1, current flows through leads 16, through connectors 27 and 28 and either through resistors 24 or 29 or thermal switches 30 and 48 depending on the temperature of the battery. This current path continues through lead 44 and connectors 31 and 32 through incandescent lamp 41 and rectifier 40 and back to the other side of alternating current source 1 through lead 17. The battery is therefore charged during one half cycle of alternating current and the indicating light 41 is turned on during the other half cycle of alternating current if the plug-socket unit 22 is properly joined.

Resistor 29 is in physical proximity with battery 25 as shown in FIG. 3, and when current passes through resistor 29 some heat is dissipated by this resistor which will cause the battery to heat up, thus biasing the battery away from the lower predetermined temperature level which may cause the loss of electrolyte in the battery cells. Applicant, therefore, utilizes two functions for resistor 29, which are heating and current limiting.

The pilot light, or indicating means 41, is isolated by diode 40 from one half cycle of A.C. source 1. If lamp 41 should fail by a short circuit, the charging of battery 25 will not be affected because of this isolation. If diode 40 were not used then a short in lamp 41 would also short the charge path of battery 25 through lead 44.

During emergency conditions the alternaing current source 1 would also usually be interrupted and therefore battery 25 is no longer being charged. The inverter circuit is then switched on, either automatically or manually, by a well known means (not shown). The battery 25 then provides operating current for the inverter 36 and ultimately lamp 37. Current then flows through lead 26 from the positive side of the battery through connectors 20 and 21 and line 35 to inverter 36. A return path is provided to the negative side of the battery through lead 34 from inverter 36 and through connectors 31 and 32 and lead 44. The operating current path from the battery to the inverter does not include resistors 24 and 29 thereby saving battery energy.

The inverter then drives lamp 37 into conduction. As can be seen from FIG. 3, the plug and socket 22 must be properly joined in order for the circuit to operate as a charging means and as a means for providing emergency power for lamp 37. If for any reason this plug-socket unit 22 is not plugged in properly, that is, if the connectors are not properly mated, then the incandescent light 41 does not come on thereby indicating that there is an improper connection.

Figure 2:
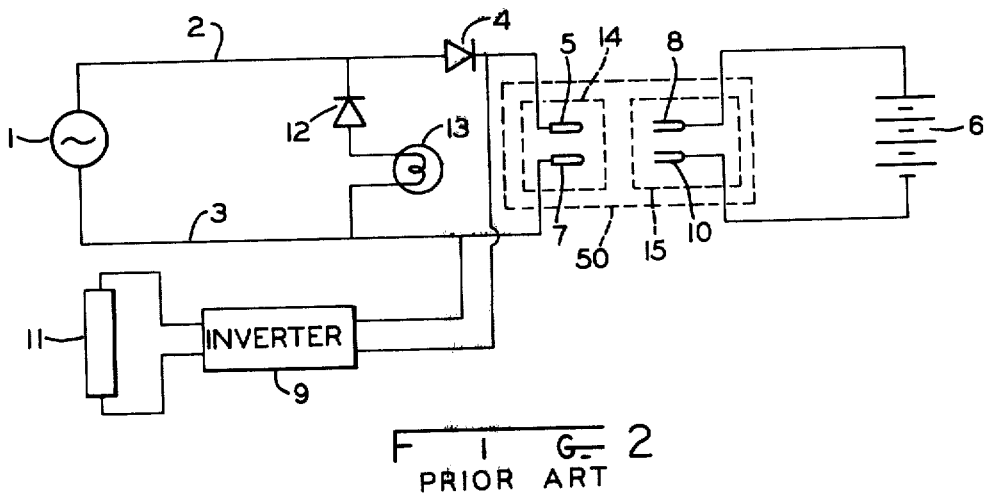
FIG. 2 is a schematic circuit diagram showing a prior art charging circuit.

In the prior art circuit shown in FIG. 2, the turning on of this light would indicate only that there is power available from source 1 since the incandescent light was connected across only the A.C. charging source. Applicant provides a unique approach to a battery charging circuit and emergency lighting circuit by connecting the indicating lamp in a circuit relationship with the inverter, the battery and the A.C. source. Furthermore, applicant provides a means for limiting the charging of the battery during certain abnormal temperature conditions and a means for heating the battery when the temperature drops below a predetermined level. The circuit as shown in FIG. 1 has been built and operated with components having the following set of values.

| | |
|---|---|
| Diode 18 | IN4004 |
| Diode 40 | IN 4004 |
| Incandescent Lamp 41 | Type 388 |
| Battery 25 | Nickel Cadmium, 14.4 volt |
| Resistor 29 | 12 ohms, 2 watt |
| Resistor 24 | 12 ohms, 2 watt |
| Thermal Switch 30 | open above 65°C |
| Thermal Switch 48 | open below 0°C |
| Plug 19 | Amphenol Connector, Catalog No. 1–480–305–0 |
| Socket 23 | Amphenol Connector, Catalog No. 1–480–303–0 |
| Gaseous Discharge Lamp 37 | 40 watt fluorescent |

From the foregoing description of the embodiment of the invention it will be apparent that many modifications may be made therein. It will be understood therefore that this embodiment of the invention is intended as an exemplification only and that this invention is not limited thereto. It is also understood, therefore, that it is intended in the appended claims to cover all modifications that fall within the true spirit and scope of this invention.

What we claim as new and desire to secure Letters Patent of the United States is:

1. A battery charging circuit comprising:
   first and second leads for connection to an A.C. source;
   a first rectifier connected to said first lead and arranged for connection to one side of the battery for providing unidirectional charging current for the battery;
   said second lead arranged for connection to the other side of the battery;
   third and fourth leads for connection to a load;
   a two-part, selectively-severable junction device having a first section and a second section; said first section including first, second and third connectors, said first rectifier and said third lead connected to said first connector, said second lead connected to said second connector, said fourth lead connected to said third connector;
   said second section being connected to the battery and having fourth, fifth and sixth connectors for mating respectively with the first, second and third connectors; said fourth connector connected to the one side of the battery, said fifth and sixth connectors connected to the other side of the battery;
   indication means and a second rectifier connected in a series circuit relationship; between said fourth lead and said first lead, said indication means providing an indication when one of said second and fourth leads is not electrically connected to the other side of the battery and providing an indication of charging of the battery.

2. A battery charging circuit as set forth in claim 1 further including a thermal responsive charging current control means connected in a circuit relation with said battery and said device second section.

3. A battery charging circuit as set forth in claim 2 wherein said thermal responsive charging current control means includes a resistance means connected between the other side of said battery and said fifth connector.

4. A battery charging circuit as set forth in claim 3 wherein said thermal responsive charging current control means further includes a thermal responsive switch connected to said resistance means for reducing charging current for battery temperature reaches a predetermined level.

5. A battery charging circuit as set forth in claim 4 wherein said resistance means and said switch means are in close physical proximity with said battery for heating said battery when the temperature falls below a predetermined level.

6. A battery charging circuit comprising:
first, second and third connectors for connecting said circuit to the battery;
first and second leads for connecting said circuit to an A.C. source; third and fourth leads for connecting the battery to a load;
a first rectifier connected between said first lead and said first connector for providing charging current for the battery during one A.C. half cycle;
said second lead connected to said second connector;
said third lead connected to said first connector;
said fourth lead connected to said third connector;
indication means connected between said fourth lead and said first lead for indicating the charging of the battery.

7. A battery charging circuit as set forth in claim 6 further including a second rectifier connected in series with said indication means for providing a current path during the other A.C. half cycle.

8. A battery charging circuit as set forth in claim 6 wherein said first, second and third connectors are contained in a plug-socket unit including a plug and a socket, whereby said indication means will indicate that said plug is electrically connected to said socket.

9. A battery charging circuit as set forth in claim 7 further including a thermal responsive current limiting means connected between said second connector and the battery for providing a predetermined current to the battery in response to predetermined battery temperature range.

10. A circuit including a charging circuit and a battery, comprising:
first and second leads for connecting said charging circuit to an A.C. source;
a plug-socket unit including first, second and third plug connectors and first, second and third socket connectors for connecting said charging circuit to said battery;
third and fourth leads for connecting said charging circuit to a gaseous discharge lamp; said third lead connected to said first plug connector and said fourth lead connected to said third plug connector;
said second lead connected to said second plug connector; a first rectifier connected between said first lead and said first plug connector;
a second rectifier connected in a series relationship with an indicating means; said series relationship connected between said first lead and said fourth lead;
said battery having one side connected to said first socket connector and the other side connected to said third socket connector;
resistance means connected between said other side of said battery and said second socket connector; said resistance means being connected in physical contact with said battery;
a thermal responsive switch connected across said resistance means.

* * * * *

UNITED STATES PATENT OFFICE
CERTIFICATE OF CORRECTION

Patent No. 3,900,783     Dated August 19, 1975

Inventor(s) Rollie R. Herzog and Robert P. Alley

It is certified that error appears in the above-identified patent and that said Letters Patent are hereby corrected as shown below:

In the specification:

Column 4, line 63, "overhead" should read --overheated--;

Column 5, line 49, "alternaing" should read --alternating--.

Signed and Sealed this twenty-fifth Day of November 1975

[SEAL]

Attest:

RUTH C. MASON
Attesting Officer

C. MARSHALL DANN
Commissioner of Patents and Trademarks